April 12, 1927.
G. E. GRANT
JAR OPENER
Filed Oct. 7, 1925
1,624,833
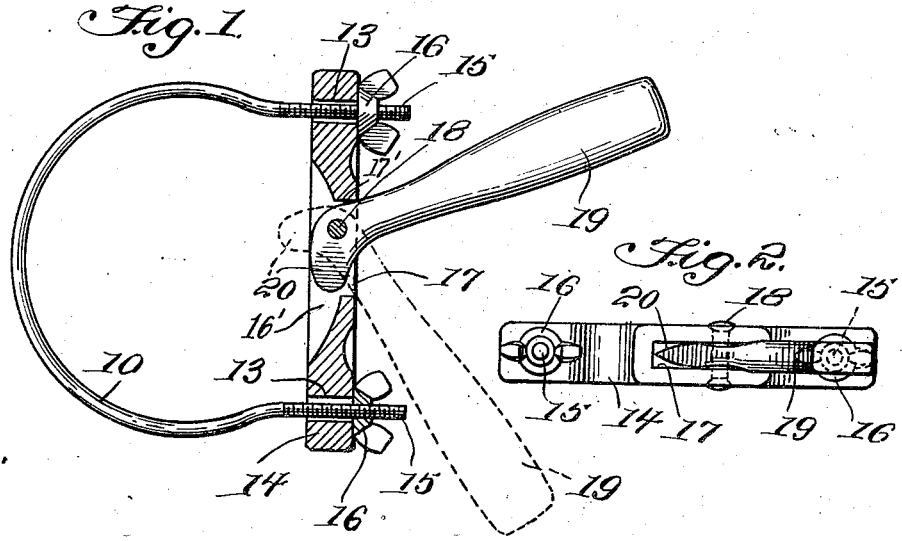
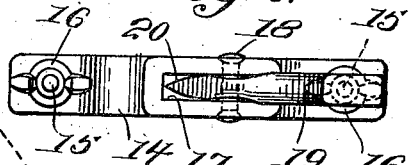
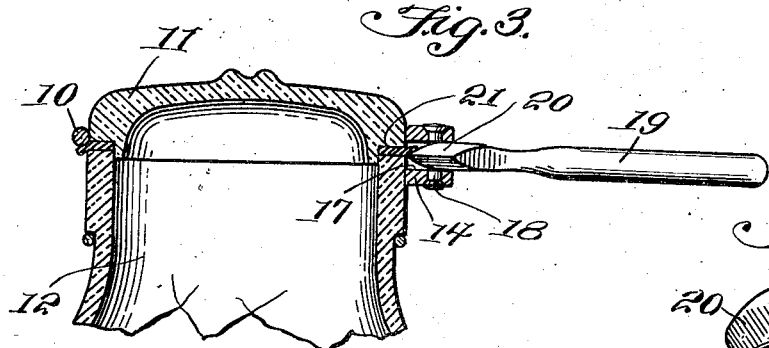
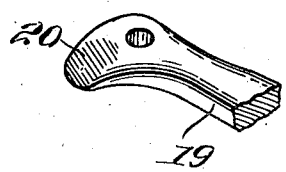
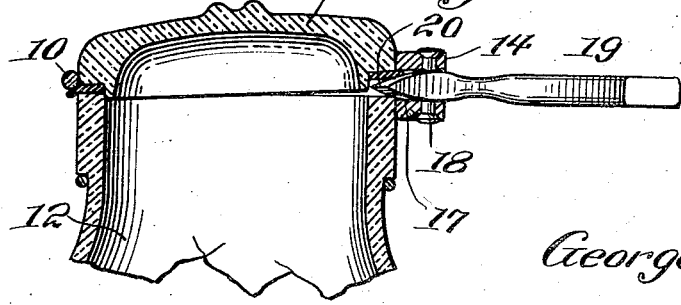
George E. Grant
INVENTOR
BY Victor J. Evans
ATTORNEY
WITNESS: J.T.L. Wright Patented Apr. 12, 1927.

1,624,833

UNITED STATES PATENT OFFICE.

GEORGE E. GRANT, OF DERRY, NEW HAMPSHIRE.

JAR OPENER.

Application filed October 7, 1925. Serial No. 61,070.

This invention has for its object the provision of a novel construction of means for removing tops from fruit jars or the like, which tops are usually held closed by means of a wire clamp, and so cling to the jar subsequent to the removal of the clamp that it is difficult to remove the top.

More specifically stated, the invention contemplates the use of a clamp designed to embrace the top of the jar, and a substantially cam-shaped lever pivoted on said clamp and arranged to pass between the jar clamp and top to loosen the latter in the manner so that it can be conveniently removed by the hand.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Fig. 1 is a plan view of the device partly in section, and also showing the active and inactive positions of the operating lever;

Fig. 2 is a view taken at a right angle to Fig. 1;

Fig. 3 is a sectional view showing how the device is associated with a jar, and the normal position of the lever;

Fig. 4 is a similar view showing the active position of the lever and the cover or top of the jar partly removed therefrom; and Fig. 5 is a fragmentary perspective view of the lever.

The jar opener forming the subject-matter of the present invention embodies a clamp including a wire element indicated at 10 and shaped to conform to the shape of the top of the jar indicated at 11, the jar itself being indicated 12. This part of the clamp has its spaced extremities threaded and arranged in parallel relation to pass through openings 13 in an elongated member 14 which is adapted to bear against the side of the top of the jar 12 when the device is in use, this arrangement being clearly illustrated in Figs. 3 and 4. The threaded extremities 15 of the clamp have nuts 16 associated therewith, so that the device in its entirety can be used in conjunction with different-sized jars. This member 14 of the clamp is of elongated contour, but may vary in size and shape, and constructed from any suitable material without departing from the inventive idea. The member itself is recessed at one side as at 16' and formed with a central slot 17 opening into said recess and in which is pivoted as at 18 a lever 19. As clearly shown in Fig. 5, the lever is formed with a cam-like offset or projection 20 which is suitably tapered to be used for the purpose to be presently described.

As hereinabove pointed out, certain type of fruit jars and the like have their tops held associated with the jar by wire clamps and other contrivances, the gasket 21 being arranged between the top and the mouth of the jar. It frequently happens that the tops of these jars become so tightly sealed, that considerable difficulty is experienced in removing said tops after they have been released from the wire clamp above mentioned. With a view to overcoming this difficulty I have devised the present invention which is adapted to be used in the following manner.

After the clamp for the top of the jar has been removed therefrom, the clamp forming part of the invention is arranged to embrace the top 11 in the manner shown in Fig. 3, with the lever 19 spaced from the top. After the clamp is tightened about the top 11, it is only necessary to swing the lever 19 upon its pivot in a direction to force the cam-like extremity 20 beneath the gasket 21, and between the top 11 and the mouth of the jar, which position of the lever is illustrated in Fig. 4, wherein it will be noted that the top 11 is partly elevated and loosened so that it can be conveniently removed by the hand. When the lever 19 is swung to the position shown by full lines in Fig. 1, the adjacent end wall 17' of the slot 17 serves as a stop to limit the movement of the lever in this direction, thereby holding the cam-shaped extremity 20 wholly disposed within the recess 16'.

While it is believed that from the foregoing description the nature and advantages of the invention will be readily apparent, I desire to have it understood that I do not limit myself to what is herein shown and described, and that such changes may be resorted to when desired as fall within the scope of what is claimed.

Having thus described the invention, what is claimed as new, is:—

A jar opener of the character described comprising a wire element curved to accommodate itself to the top of the jar about which it is adapted to be arranged, and having spaced parallel threaded extremities, an elongated member adapted to be arranged at one side of said top and having openings to slidably receive said extremities, said member being recessed on one side and having a central slot opening into said recess, a lever having a cam-shaped extremity pivoted within the slot and tapered to be forced between the jar and the top therefor for the purpose specified, one end of the slot constituting a stop to limit the movement of the lever in one direction when the cam-shaped extremity is wholly disposed within said recess, and nuts threaded on the extremities of said wire element.

In testimony whereof I affix my signature.

GEORGE E. GRANT.